(No Model.) 7 Sheets—Sheet 1.

H. W. GODFREY, C. F. LEAKE & C. E. LUCAS.
MACHINE FOR MANUFACTURE OF FLOOR CLOTHS.

No. 535,101. Patented Mar. 5, 1895.

(No Model.) 7 Sheets—Sheet 2.

H. W. GODFREY, C. F. LEAKE & C. E. LUCAS.
MACHINE FOR MANUFACTURE OF FLOOR CLOTHS.

No. 535,101. Patented Mar. 5, 1895.

(No Model.) 7 Sheets—Sheet 3.
H. W. GODFREY, C. F. LEAKE & C. E. LUCAS.
MACHINE FOR MANUFACTURE OF FLOOR CLOTHS.
No. 535,101. Patented Mar. 5, 1895.

(No Model.) 7 Sheets—Sheet 4.

H. W. GODFREY, C. F. LEAKE & C. E. LUCAS.
MACHINE FOR MANUFACTURE OF FLOOR CLOTHS.

No. 535,101. Patented Mar. 5, 1895.

(No Model.) 7 Sheets—Sheet 5.

H. W. GODFREY, C. F. LEAKE & C. E. LUCAS.
MACHINE FOR MANUFACTURE OF FLOOR CLOTHS.

No. 535,101. Patented Mar. 5, 1895.

(No Model.) 7 Sheets—Sheet 6.

H. W. GODFREY, C. F. LEAKE & C. E. LUCAS.
MACHINE FOR MANUFACTURE OF FLOOR CLOTHS.

No. 535,101. Patented Mar. 5, 1895.

(No Model.) 7 Sheets—Sheet 7.

H. W. GODFREY, C. F. LEAKE & C. E. LUCAS.
MACHINE FOR MANUFACTURE OF FLOOR CLOTHS.

No. 535,101. Patented Mar. 5, 1895.

Fig. 13.

UNITED STATES PATENT OFFICE.

HENRY WILLIAM GODFREY, CHARLES FREDERICK LEAKE, AND CHARLES EDWARD LUCAS, OF LONDON, ENGLAND.

MACHINE FOR MANUFACTURE OF FLOOR-CLOTH.

SPECIFICATION forming part of Letters Patent No. 535,101, dated March 5, 1895.

Application filed October 15, 1894. Serial No. 526,003. (No model.)

*To all whom it may concern:*

Be it known that we, HENRY WILLIAM GODFREY, CHARLES FREDERICK LEAKE, engineers, and CHARLES EDWARD LUCAS, linoleum-manufacturer, subjects of the Queen of Great Britain, residing at Staines, in the county of Middlesex, London, England, have invented certain new and useful Improvements in Machines for the Manufacture of Floor-Cloth, of which the following is a specification.

The object of this invention is to provide automatic machinery by which linoleum and like floor cloths may be made with a pattern surface formed from fine granulated linoleum or like material applied over them with the aid of flat perforated stencil plates according to the system described in the specification of a British Patent granted to us No. 4,482 in the year 1888. To effect this we construct the machinery in such a manner that the trays carrying the stencil plates in place of being set by hand onto and taken off from the fabric that is being coated are automatically placed across the fabric at distances apart equal to the width of one stencil plate and then have a proper quantity of coating material delivered into each and afterward are made to travel forward for a time with the fabric and during this time have scrapers moved to and fro across them to cause the material to fill the holes in the stencil plates and are then lifted back to their first position and again deposited on the fabric just as the fabric has traveled a distance equal to the width of one of the stencil plates after the time that the stencil plate was first placed upon the fabric.

The drawings annexed show a machine constructed according to our invention.

A is the cloth to be covered.

Figure 9:
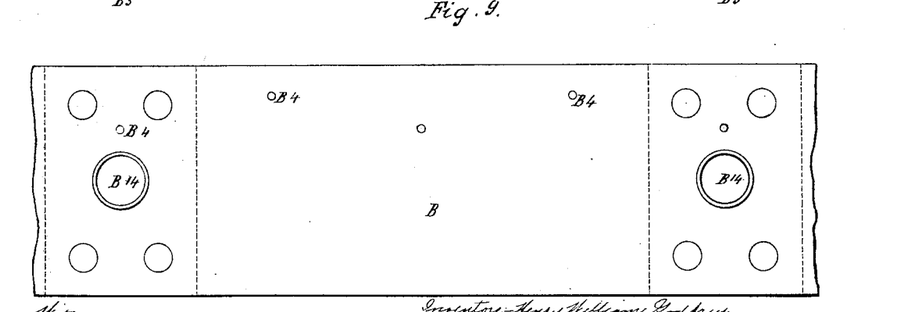
Fig. 9 is a plan view of part of one of the endless bands B.
Figure 10:
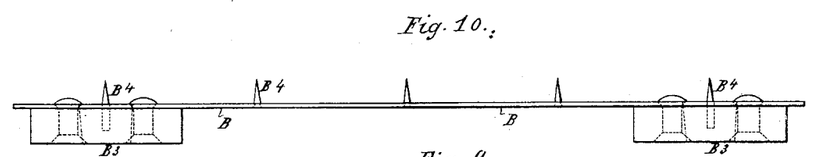
Fig. 10 is an edge view of the same.
Figure 11:
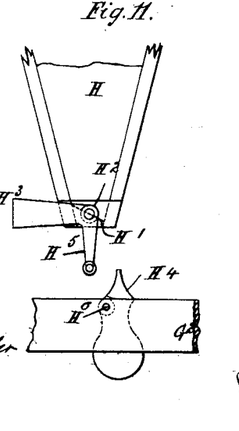
Fig. 11 is an end elevation of part of one of the hoppers H.
Figure 12:
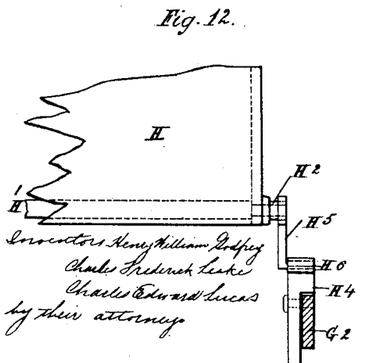
Fig. 12 is a front elevation of part of the same.

B B are two endless bands of steel one at each side of the machine. They pass around notched wheels $B'$ on axes $B^2 B^{2\times}$ and projections $B^3$ upon them gear with the notches in the wheels. The bands also have spikes or pins $B^4$ projecting out from them. These pins pass through the side edges of the fabric that is being covered.

C is a flat table over the surface of which the fabric is drawn.

Figure 4:
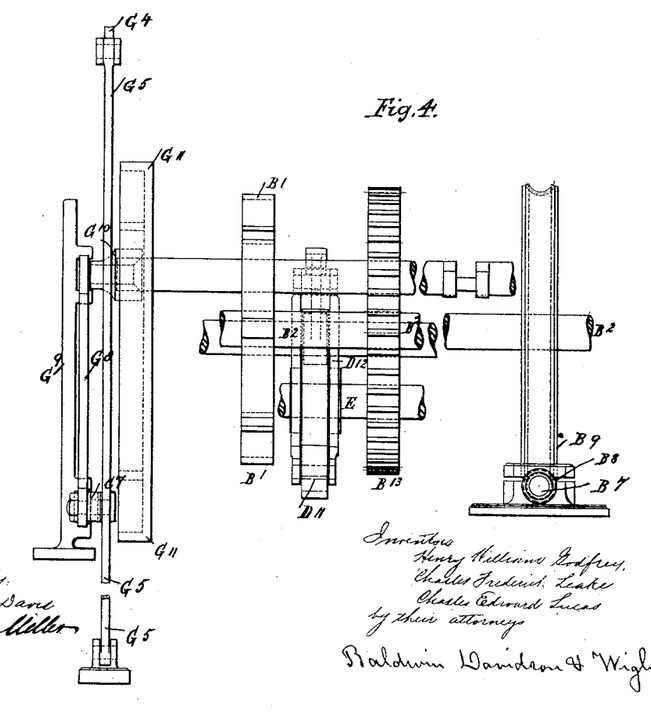
Fig. 4 is a cross section showing how the cam and crank shafts are driven.
Figure 5:
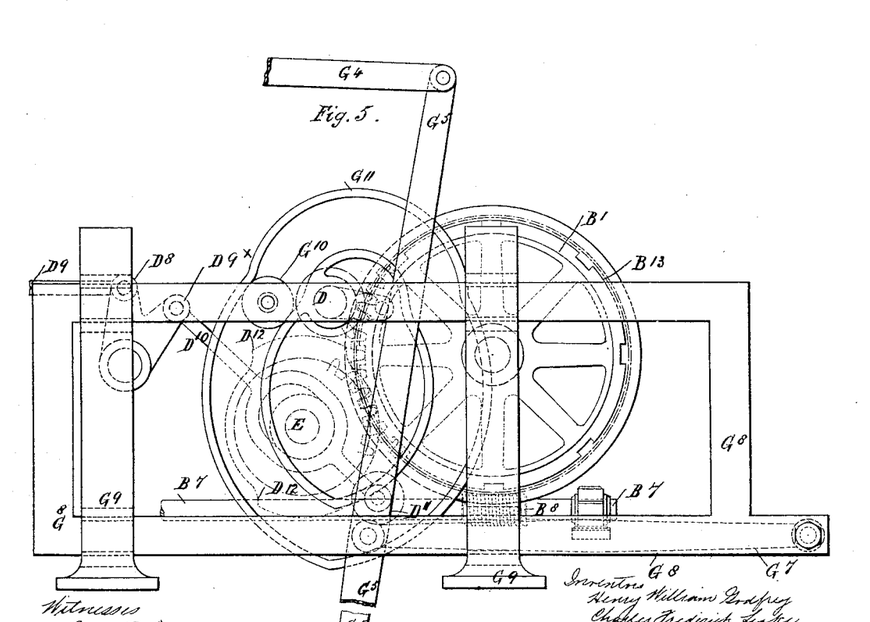
Fig. 5 is a side elevation of part of the machine on a larger scale than Fig. 1.
Figure 13:
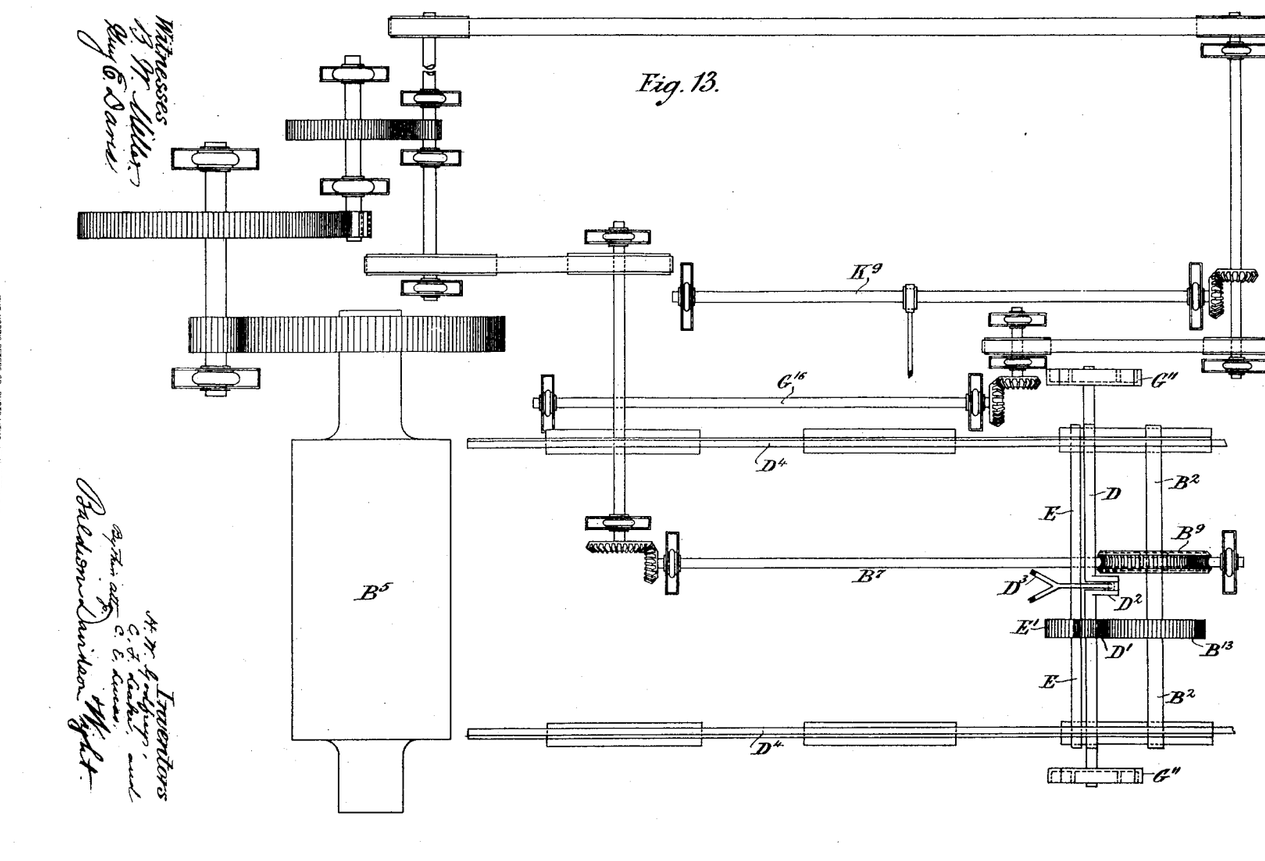
Fig. 13 is a diagram plan view of the driving gear.

The fabric passes from the roll $A'$ under guide rollers $A^2 A^3$ partly around the circumference of a cylinder $A^4$, then over the table C at which time its edges are held by the spikes $B^4$ on the bands B—and then around and between the rollers $B^5 B^6$. These rollers have a slow continuous revolving motion imparted to them by driving gear. From the same driving gear motion is also imparted to a longitudinal shaft $B^7$ (see Figs. 4, 5 and 13) on which is a worm $B^8$. This worm gears with a worm wheel $B^9$ fast on the axis $B^2$ of one of the pairs of notched wheels $B'$ and drives these wheels at the same surface speed as the rollers $B^5 B^6$. On this same axis $B^2$ is also a toothed wheel $B^{10}$ which gears into an intermediate pinion $B^{11}$ that gears into and drives a toothed wheel $B^{12}$ on the axis of the cylinder $A^4$. This cylinder is therefore driven not only by the cloth A which passes around it but also by the gearing. On the axis $B^2$ is also a toothed wheel $B^{13}$. This gears into and drives (see Fig. 1) a pinion $D'$ on a crank shaft D and also a pinion $E'$ on a cam shaft E. The pinions $D' E'$ are of such a size that the crank shaft makes two revolutions for every revolution of the cam shaft. On the crank shaft D is a crank $D^2$ from which connecting rods $D^3$ pass to two horizontal boards $D^4$ and give to them an endwise to and fro motion. There is one of these boards along each side of the machine. The boards $D^4$ rest upon guide supports $D^5$. These are jointed to the ends of lever arms $D^6$ carried on axes $D^7$.

Other arms $D^8$ on these axes are coupled by a connecting rod $D^9$ (see Fig. 1) so that when one axis is turned the others turn with it. On one of these axes $D^7$ is also a lever arm $D^9$ to which is jointed a rod $D^{10}$ carrying a truck $D^{11}$ acted on by a cam $D^{12}$ which is fast on the cam shaft E. The cams cause the boards $D^4$ to be lifted at one end of the to and fro horizontal movement of the boards and to be lowered at the opposite end of this movement.

Figure 1:
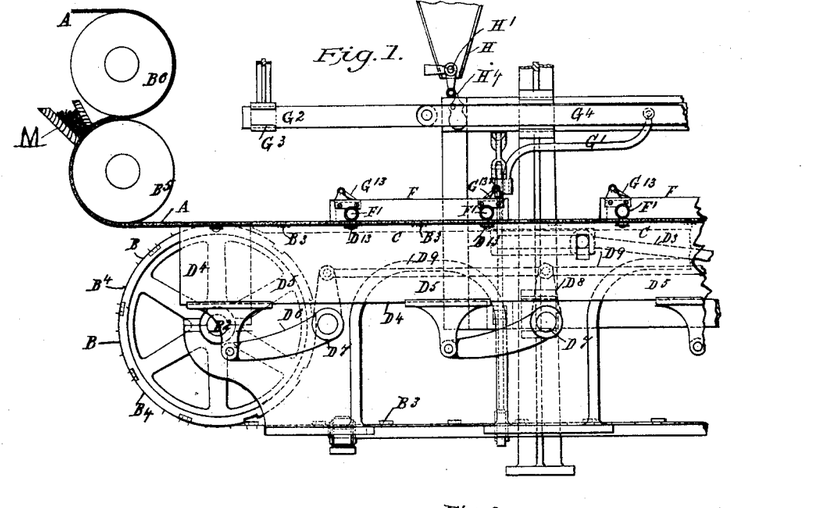
Figure 1 is a side elevation partly in section of the machine.
Figure 2:
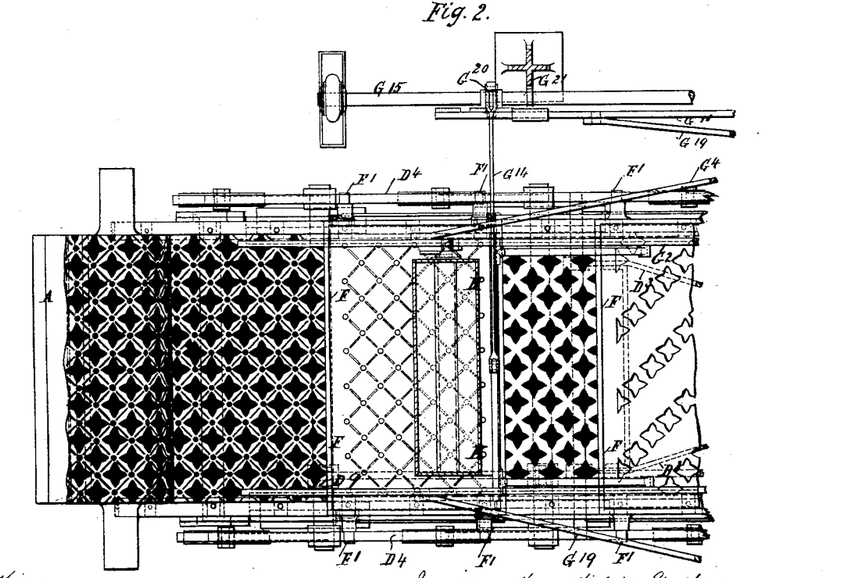
Fig. 2 is a plan view.

F F F are three frames or trays the bottom of each of which is formed of a flat stencil plate. Three frames only are shown — but any desired number of frames might be used. From each end of each tray project two pins F' F' and in the top edge of the lifting boards $D^4$ are notches $D^{13}$ one below each pin F'. When the lifting boards are at the right hand end of their travel as seen in Fig. 1 they descend leaving the trays resting on the fabric that is being covered. When the lifting boards are at the left hand end of their travel they rise and the notches in the boards catch the pins F' on the trays and lift the trays clear of the fabric and as the boards make their horizontal movement toward the right hand end of the machine they carry back the trays with them. The length of the horizontal movement given to the boards is equal to half the width of each stencil plate and spaces corresponding to the width of the stencil plates are left between the three plates. To insure the placing of the trays F in proper position on to the fabric and also to insure their being carried forward with the fabric when placed upon it pins projecting downward from the ends of the trays are made to enter holes $B^{14}$ formed through the endless band B and through the projections $B^3$ which are fixed to their under side.

The gear wheels $B^{10}$ $B^{11}$ $B^{12}$ and the crank $D^2$ are so proportioned that the trays rest on the fabric while the fabric is traveling a distance equal to half the width of a stencil plate and is lifted and brought back to its first position while the fabric is traveling an equal distance.

Figure 6:
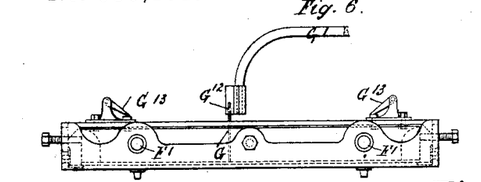
Fig. 6 is an end elevation of one of the stencil trays and its scraper.
Figure 7:
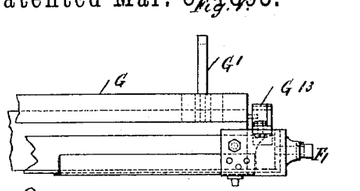
Fig. 7 is a side elevation of part of the same.
Figure 8:
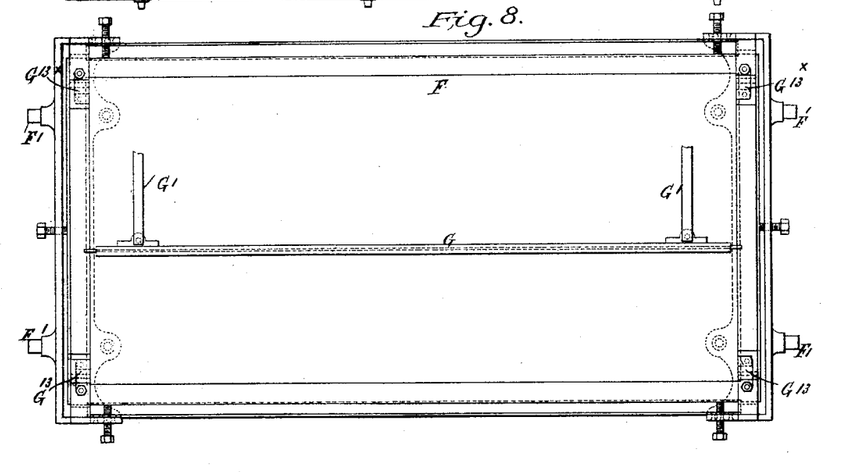
Fig. 8 is a plan view.

G G G are scrapers resting on the top of the stencil plates carried by the trays and extending from one end to the other of these plates. Each scraper G (Fig. 6) has arms G' extending from it. These at their ends are jointed to horizontal bars $G^2$ one bar at each side of the machine. The bars are supported in fixed bearings $G^3$ and have an endwise to and fro movement given to them in the following manner:—The bars are connected by links $G^4$ with the upper ends of long upright levers $G^5$ which can be rocked on a fulcrum $G^6$ at their lower end. Each lever at an intermediate point in its length is coupled by a connecting rod $G^7$ with a frame $G^8$ which has a horizontal to and fro reciprocating movement given to it. Each frame is supported in guides on fixed upright standards $G^9$. It also carries a truck or roller $G^{10}$ acted on by a cam $G^{11}$ which is fast on the crank shaft D. The cam is of such a shape that when the trays F have been deposited on to the fabric being coated and are in the position shown in Fig. 1 just commencing to be carried forward with the fabric the scrapers are also in the positions shown at the right hand of the trays and as the trays are carried forward with the fabric are caused to travel in the same direction as the trays and faster than them so that they scrape over the bottom of the trays. When they have scraped over the stencil plates which form the bottom of the trays F pins $G^{12}$ projecting from the ends of the scrapers G come against inclined tongues $G^{13}$ which are pin jointed to the ends of the frames F. The pins slide up these inclines so lifting the scrapers away from the stencil plates. When the pins $G^{12}$ have passed beyond the upper end of the inclined tongues the scrapers G drop on to the bottom of the trays F—and are thereby brought to the left hand side of any granulated material which was previously being pushed over the surface of the stencil plate by the scraper. The scrapers are now moved in a direction from left to right of the trays and again scrape this material over the surface of the stencil plates. As the scrapers are moved in this direction the pins $G^{12}$ lift the tongues $G^{13}$ and pass freely below them. As the scrapers arrive at the right hand of the trays the pins $G^{12}$ come against other inclined tongues $G^{13\times}$. These similarly lift the scrapers off from the stencil plates and when the pins have passed beyond the upper ends of the inclined tongues the scrapers again drop on to the bottom of the trays ready to be again moved over the stencil plates. The scrapers are brought into this position just as the trays are about to be lifted from off the fabric and are about to be moved back to be again brought into the position shown in Fig. 1. As the trays are so moved back toward the right hand end of Fig. 1 the scrapers are by the formation of the cams $G^{11}$ caused to travel back with them.

Figure 3:
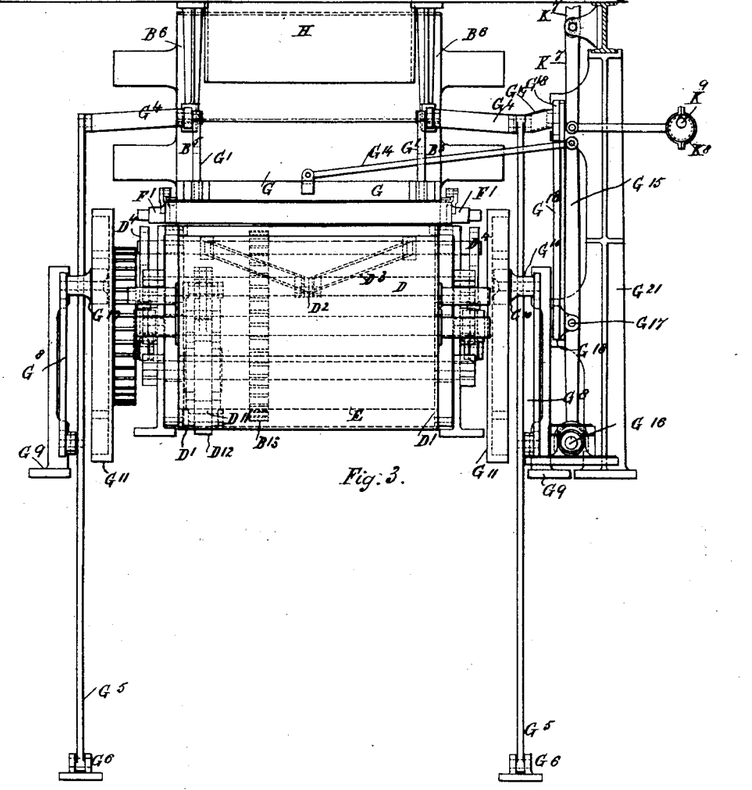
Fig. 3 is a front end view partly in section.

In addition to the scrapers being moved to and fro across the bottom of the trays F as above described the scrapers have also a short endwise to and fro reciprocating motion given to them. Each scraper is for this purpose coupled by a link $G^{14}$ to the inner end of a lever $G^{15}$ (see Fig. 3) which has a short oscillating to and fro motion given to it by its lower end being acted upon by an eccentric on a continuously revolving shaft $G^{16}$. The fulcrums $G^{17}$ of the levers $G^{15}$ are carried by a frame $G^{18}$ to which is given a to and fro horizontal motion exactly corresponding to the to and fro horizontal motion given to the scrapers G. The frame has this horizontal to and fro motion given to it through a connecting rod $G^{19}$ which connects it to the oscillating levers $G^5$ from which the scrapers G also receive their horizontal motion. The frame is supported in guide bearings on the standards $G^{21}$.

The eccentrics which give a rocking motion to the lower ends of the levers $G^{15}$ have collars $G^{20}$ on either side of them. The forked lower end of the lever embraces the eccentric between these collars and slides the eccentric to and fro along the shaft $G^{16}$—the eccentrics being mounted on the shaft so that they can be slid along but not turned around it.

The granulated material of various colors which is to be placed in patterns on to the surface of the fabric that is being covered is contained in hoppers H and each time that the trays F are lowered on to the fabric a certain measured amount of granulated material is allowed to drop from each hopper and to fall into the trays below. This is effected in the following manner:—A measured quantity of granulated material is dropped into each hopper H just before this granulated material is to be allowed to drop on to the trays. The bottoms of the hoppers are at this time closed by flaps $H'$ on axes $H^2$ which can have a partial turn given to them. Normally the flaps are by weighted arms $H^3$ fixed on their axes held in the positions shown in Fig. 1. They then close the bottoms of the hoppers. When the trays have been lowered on to the fabric that is being coated and the trays are just commencing to move forward with the fabric, pawls $H^4$ jointed to the reciprocating rod $G^2$ come against the lower ends of arms $H^5$ fixed on the axes $H^2$ of the flaps $H'$ and turn the flaps into such a position that the material in the hoppers H is free to drop from them into the trays below. The pawls $H^4$ then pass beyond the ends of the arms $H^5$ and the flaps again close the bottom of the hoppers. On the return movement of the reciprocating rods $G^2$ the pawls $H^4$ when they come against the arms $H^5$ turn on pins $H^6$ by which they are jointed to the rods and are carried freely past them. The pieces $H^4$ being weighted then resume their former positions.

Figure 14:
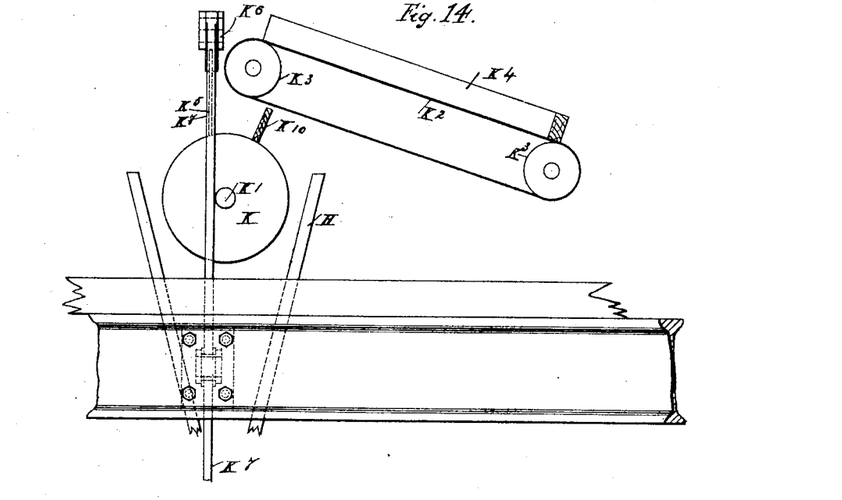
Fig. 14 is an end elevation of the mechanism by which covering material is supplied to the hoppers H.
Figure 15:
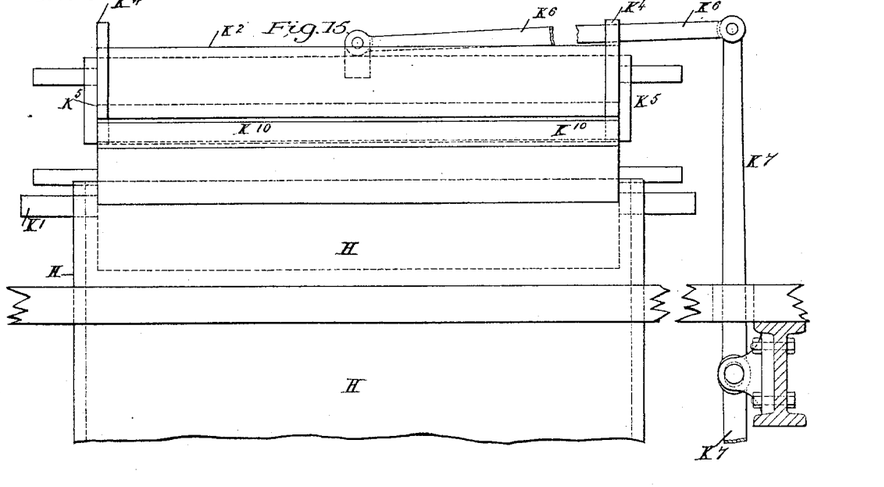
Fig. 15 is a front elevation of the same.

Measured quantities of material are supplied to the hoppers H in the following manner:—At the top of each hopper is a cylinder K see Fig. 14 on an axis $K'$ to which a slow continuous revolving movement is imparted. $K^2$ is an endless apron passing around rollers $K^3$ to which a slow continuous revolving movement is also imparted. The material to be supplied to the hoppers H is placed on to the upper surface of the endless apron to a uniform depth. To facilitate the covering of the apron to a uniform depth boards $K^4$ are placed along its side edges. When material has been placed on to the apron the material can be leveled by moving over it a straight edge kept resting at its ends on the boards $K^4$. One of the rollers $K^3$ around which the apron passes is as shown just above the top of the hopper H. As the apron slowly revolves some of the material as it is carried past the top of this roll drops continuously on to the top of the cylinder K. As this cylinder slowly turns the material dropped down on to it is brought against a strickle or blade $K^5$ the lower edge of which is parallel with and at a short distance from the circumference of the cylinder. An endwise to and fro movement is given to the blade $K^5$ by its being connected by a rod $K^6$ to the upper end of a lever $K^7$ the lower end of which has a short to and fro oscillating motion given to it by an eccentric $K^8$ (see Fig. 3) on a continuously revolving shaft $K^9$. A layer of the material of uniform thickness is thus carried forward on the circumference of the cylinder past the blade $K^5$ and is allowed to drop into the hopper H.

$K^{10}$ is a fixed board to prevent any of the material dropping into the hopper H without passing under the blade $K^5$.

L is a hopper from which a uniform layer of covering material may be placed on to the upper surface of the fabric A as it enters the machine.

M is a hopper from which a uniform layer of material may be placed over the back of the coated fabric as it leaves the machine; or this backing might be applied to the fabric by a separate machine before bringing it to the machine hereinbefore described.

What we claim is—

1. The combination of a table, mechanism for drawing fabric continuously over the surface of the table, trays with stencil plates at the bottom supported at distances apart above and across the fabric—mechanism for lowering the trays on to the fabric allowing them to be carried forward along with it for a distance and for then again lifting them and bringing them back to their first position to be again lowered on to the fabric—scrapers resting on the stencil plates at the bottom of each tray and mechanism for moving the scrapers to and fro across the trays while they are being carried forward with the fabric and hoppers above each tray for discharging into them measured quantities of granulated coating material just after they are lowered on to the fabric.

2. The combination of a table, endless traveling bands at each side of the table having spikes projecting from them above the level of the table—trays with stencil plates at the bottom above the table and at distances apart—horizontal lifting boards one at each side of the machine for lowering the trays on to fabric that is being drawn over the table for allowing the trays to be carried forward by the fabric and for then again lifting them and bringing them back to their first position to be again lowered—scrapers resting on the stencil plates at the bottom of each tray and mechanism for moving the scrapers to and fro across the trays while they are being carried forward with the fabric and hoppers above each tray for discharging into them measured quantites of granulated coating material just after they are lowered on to the fabric.

3. The combination of the table C, endless traveling bands B at each side of the table with pins $B^4$ projecting upward from them above the top of the table—trays F with bottom formed of stencil plates—pins $F'$ projecting from the ends of the trays, lifting boards D⁴ one along each side of the machine with notches in them one below each pin F'—rocking levers D⁶ for raising and lowering the lifting boards—cams D¹² on revolving shaft E for rocking the levers D⁶—connecting rods D³ and crank D² on a crank shaft D for giving a horizontal to and fro movement to the lifting boards D⁴.

4. The combination of the table C, endless traveling bands B at each side of the table, trays F with bottom formed of stencil plates and lifting boards D⁴ one along each side of the machine below the ends of the trays moved forward in the same direction as the travel of the bands B while the trays are carried forward with the bands a distance equal to half the width of a stencil plate and then lifted to raise the trays away from the bands and moved backward to their original position during the time that the bands again travel forward a distance equal to half the width of a stencil plate, and mechanism for operating the trays to give to them the aforesaid movements.

5. The combination of the table C endless traveling bands B at each side of the table—notched wheels B' on axes B² around which the bands pass, trays F with bottom formed of stencil plates, lifting boards D⁴ one along each side of the machine below the ends of the trays, revolving shaft D gearing with one of the axes B² so as to make one revolution while the bands travel forward a distance equal to the width of a stencil plate, crank D² on shaft D giving a to and fro motion to the lifting boards equal to half the width of a stencil plate and revolving cam E raising the lifting boards at the end of their forward movement to lift the trays and disengage them from the traveling bands and lowering them at the end of their backward movement to lower the trays and allow them again to engage with the traveling bands.

6. The hereinbefore described combination of mechanism for scraping granulated coating material over the surface of the stencil plates while they are resting upon and traveling along with the fabric that is being covered consisting of the stencil plates, scrapers G resting on the stencil plates, the sliding bars G², arms G' jointing the scrapers to the horizontally sliding bars, levers G⁵ coupled to the sliding bars and revolving cams G¹¹ for rocking the levers to move the bars horizontally to and fro.

7. The combination of the trays F having stencil plates at bottom, inclined tongues jointed to them at the ends—scrapers G moved to and fro across the stencil plates—pins G¹² projecting from the ends of the scrapers to come against the inclined tongues and lift the scrapers just before they come to the end of their traverse and allow the scrapers to drop when they have passed beyond the rear ends of the tongues—and pass below the tongues on the return movement of the scrapers.

8. The combination of the trays F having stencil plates at bottom—scrapers G moved to and fro across the stencil plates—hoppers H above the trays—flaps or doors H' at bottom of each hopper, pawls H⁴ jointed to the to and fro sliding bars G² for opening the flaps or doors and allowing all material in the hoppers to drop from them into the trays just as the scrapers commence to travel across them.

9. The combination, substantially as hereinbefore set forth of a slowly revolving roller K, a blade K⁵, parallel with the roller and a slight distance from its surface, means for reciprocating the blade K⁵ back and forth across the face of the roller, an endless band K² for carrying forward a layer of granulated material and dropping it continuously little by little on the roller K, to be conveyed by it below the blade K⁵, and means for actuating the endless band.

HENRY WILLIAM GODFREY.
CHARLES FREDERICK LEAKE.
CHARLES EDWARD LUCAS.

Witnesses:
L. E. S. THOMAS,
 *Rose Villa, London Road, Staines.*
H. CAIGER,
 *No. 2 Factory Path, Staines.*